(12) United States Patent
Rupnowski et al.

(10) Patent No.: US 10,480,935 B2
(45) Date of Patent: Nov. 19, 2019

(54) THICKNESS MAPPING USING MULTISPECTRAL IMAGING

(71) Applicant: Alliance for Sustainable Energy, LLC, Golden, CO (US)

(72) Inventors: Przemyslaw Rupnowski, Golden, CO (US); Michael Joseph Ulsh, Broomfield, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 42 days.

(21) Appl. No.: 15/830,585

(22) Filed: Dec. 4, 2017

(65) Prior Publication Data

US 2018/0156603 A1 Jun. 7, 2018

Related U.S. Application Data (60) Provisional application No. 62/429,383, filed on Dec. 2, 2016.

(51) Int. Cl.
*G01B 11/06* (2006.01)

(52) U.S. Cl.
CPC .................. *G01B 11/06* (2013.01)

(58) Field of Classification Search
CPC ........................................... G01B 11/06
USPC ........................................... 356/630
See application file for complete search history.

(56) References Cited

U.S. PATENT DOCUMENTS 3,426,201 A 2/1969 Hilton et al.
4,243,473 A 1/1981 Yamaguchi et al.
(Continued)

FOREIGN PATENT DOCUMENTS

JP 62-119439 5/1987
JP 03-214043 9/1991
(Continued)

OTHER PUBLICATIONS

Aieta et al., "Applying infrared thermography as a quality-control tool for the rapid detection of polymer-electrolyte-membrane-fuel-cell catalyst-layer-thickness variations", Journal of Power Sources, vol. 211, Feb. 20, 2012, pp. 4-11.
(Continued)

*Primary Examiner* — Tarifur R Chowdhury
*Assistant Examiner* — Omar H Nixon
(74) *Attorney, Agent, or Firm* — Robert G. Pittelkow; Michael A. McIntyre (57) ABSTRACT

An example system includes a material transport system configured to transport a substantially planar material through a monitoring zone, an illumination source configured to illuminate at least a portion of the material that is within the monitoring zone with light, and a sensor configured to obtain a plurality of consecutive datasets. Datasets indicate, for locations of the material and for a specific wavelength of light, a respective intensity of the light that is of the wavelength and that is received from the location. The system also includes a processing system configured to receive the dataset, determine, based on the dataset and for each of at least two locations in the plurality of locations, a respective value of a thickness of the material, and execute, based on the respective value of the thickness of the material for at least one of the at least two locations, an action.

21 Claims, 8 Drawing Sheets

(56) References Cited

U.S. PATENT DOCUMENTS

| | | | |
|---|---|---|---|
| 4,329,052 | A | 5/1982 | Colombo et al. |
| 4,449,818 | A | 5/1984 | Yamaguchi et al. |
| 4,482,245 | A | 11/1984 | Makabe et al. |
| 4,511,800 | A | 4/1985 | Harbeke et al. |
| 4,583,861 | A | 4/1986 | Yamaji et al. |
| 4,614,424 | A | 9/1986 | Koizumi et al. |
| 4,626,101 | A | 12/1986 | Ogawa et al. |
| 4,687,325 | A | 8/1987 | Corby, Jr. |
| 4,751,546 | A | 6/1988 | Yamamoto et al. |
| 4,772,126 | A | 9/1988 | Allemand et al. |
| 4,794,265 | A | 12/1988 | Quackenbos et al. |
| 4,840,487 | A | 6/1989 | Noguchi et al. |
| 4,881,863 | A | 11/1989 | Braginsky |
| 4,885,709 | A | 12/1989 | Edgar et al. |
| 4,923,779 | A | 5/1990 | Nelson |
| 4,925,298 | A | 5/1990 | Dobrilla |
| 4,968,892 | A | 11/1990 | McAtee |
| 4,972,092 | A | 11/1990 | Schmitt et al. |
| 5,008,542 | A | 4/1991 | Look et al. |
| 5,114,230 | A | 5/1992 | Pryor |
| 5,268,749 | A | 12/1993 | Weber et al. |
| 5,334,844 | A | 8/1994 | Pollard et al. |
| 5,365,084 | A | 11/1994 | Cochran et al. |
| 5,367,174 | A | 11/1994 | Bazile et al. |
| 5,406,367 | A | 4/1995 | Sopori |
| 5,455,870 | A | 10/1995 | Sepai et al. |
| 5,490,728 | A | 2/1996 | Schietinger et al. |
| 5,537,203 | A | 7/1996 | Carr |
| 5,581,346 | A | 12/1996 | Sopori |
| 5,586,663 | A | 12/1996 | Graudejus et al. |
| 5,634,267 | A | 6/1997 | Farnworth et al. |
| 5,696,591 | A | 12/1997 | Bilhorn et al. |
| 5,699,447 | A | 12/1997 | Alumot et al. |
| 5,724,268 | A | 3/1998 | Sodickson et al. |
| 5,763,765 | A | 6/1998 | Lamont et al. |
| 5,777,729 | A | 7/1998 | Aiyer et al. |
| 5,796,484 | A | 8/1998 | Homma et al. |
| 5,805,291 | A * | 9/1998 | Calvin ............ G01B 11/0691 250/559.12 |
| 5,811,211 | A | 9/1998 | Tanaka et al. |
| 5,999,673 | A | 12/1999 | Valentin et al. |
| 6,057,924 | A * | 5/2000 | Ross ................. G01B 11/06 356/503 |
| 6,060,677 | A * | 5/2000 | Ulrichsen ............ B07C 5/342 209/577 |
| 6,064,759 | A | 5/2000 | Buckley et al. |
| 6,154,034 | A | 11/2000 | Lovelady et al. |
| 6,201,261 | B1 | 3/2001 | Sopori |
| 6,275,295 | B1 | 8/2001 | Sopori |
| 6,315,574 | B1 | 11/2001 | Kamieniecki et al. |
| 6,327,374 | B1 | 12/2001 | Piironen et al. |
| 6,369,401 | B1 | 4/2002 | Lee |
| 6,386,676 | B1 | 5/2002 | Yang et al. |
| 6,393,915 | B1 | 5/2002 | Banet et al. |
| 6,473,062 | B1 | 10/2002 | Debiez et al. |
| 6,532,064 | B1 | 3/2003 | Hearn et al. |
| 6,707,958 | B2 | 3/2004 | Pering et al. |
| 6,775,012 | B2 | 8/2004 | Wurz et al. |
| 6,911,350 | B2 | 6/2005 | Tsidilkovski et al. |
| 6,998,628 | B2 | 2/2006 | Chelvayohan |
| 7,106,077 | B2 | 9/2006 | Kaz et al. |
| 7,177,030 | B2 | 2/2007 | Leizerson et al. |
| 7,177,033 | B2 | 2/2007 | Yoshida |
| 7,179,553 | B2 | 2/2007 | Murphy et al. |
| 7,181,986 | B2 | 2/2007 | Roth |
| 7,190,447 | B2 | 3/2007 | Meeks |
| 7,211,345 | B2 | 5/2007 | Hampden-Smith et al. |
| 7,238,912 | B2 | 7/2007 | Sopori |
| 7,284,411 | B2 | 10/2007 | Roth |
| 7,358,494 | B1 | 4/2008 | Gao et al. |
| 7,362,426 | B1 | 4/2008 | Yoo |
| 7,399,975 | B2 | 7/2008 | Harrison |
| 7,502,119 | B2 | 3/2009 | Chalmers et al. |
| 7,567,351 | B2 | 7/2009 | Opsal et al. |
| 7,589,843 | B2 | 9/2009 | Aiyer et al. |
| 7,635,830 | B2 | 12/2009 | Diederichs |
| 7,664,294 | B2 | 2/2010 | Sacher et al. |
| 7,671,620 | B2 | 3/2010 | Manz |
| 7,687,176 | B2 | 3/2010 | Roscoe et al. |
| 7,729,528 | B2 | 6/2010 | O'Dell et al. |
| 7,809,472 | B1 | 10/2010 | Silva et al. |
| 7,815,862 | B2 | 10/2010 | Sopori |
| 8,701,210 | B2 | 4/2014 | Cheng et al. |
| 2002/0154318 | A1 | 10/2002 | Matsunaga et al. |
| 2002/0166977 | A1 | 11/2002 | Kohda et al. |
| 2002/0182333 | A1 | 12/2002 | Seaver et al. |
| 2003/0210394 | A1 | 11/2003 | Wei |
| 2004/0150820 | A1 | 8/2004 | Nikoonahad et al. |
| 2004/0223165 | A1 * | 11/2004 | Kurokawa ......... G01B 11/0633 356/630 |
| 2005/0041251 | A1 | 2/2005 | Cao et al. |
| 2005/0141363 | A1 * | 6/2005 | Shimamoto .......... G11B 7/0945 369/44.29 |
| 2005/0196882 | A1 | 9/2005 | Steeples |
| 2005/0264798 | A1 | 12/2005 | Nishiyama et al. |
| 2006/0001430 | A1 | 1/2006 | Kepler et al. |
| 2006/0262320 | A1 | 11/2006 | Kawasaki et al. |
| 2007/0002331 | A1 | 1/2007 | Hall |
| 2007/0002333 | A1 | 1/2007 | Ueki et al. |
| 2007/0024871 | A1 | 2/2007 | Maznev |
| 2007/0059589 | A1 | 3/2007 | Arasawa |
| 2007/0090189 | A1 | 4/2007 | Suwa et al. |
| 2007/0109540 | A1 | 5/2007 | Maznev |
| 2007/0229847 | A1 | 10/2007 | Indars et al. |
| 2007/0231930 | A1 | 10/2007 | Funk et al. |
| 2007/0259256 | A1 | 11/2007 | Le Canut et al. |
| 2007/0274447 | A1 | 11/2007 | Mazor et al. |
| 2008/0026294 | A1 | 1/2008 | Jiang |
| 2008/0028860 | A1 | 2/2008 | Refko et al. |
| 2008/0042654 | A1 | 2/2008 | Kato |
| 2008/0055591 | A1 | 3/2008 | Walton |
| 2008/0062422 | A1 | 3/2008 | Thomas et al. |
| 2008/0118783 | A1 | 5/2008 | Cetegen et al. |
| 2008/0150540 | A1 | 6/2008 | Okuda |
| 2008/0151237 | A1 | 6/2008 | Lian et al. |
| 2008/0165924 | A1 | 7/2008 | Wang et al. |
| 2008/0197857 | A1 | 8/2008 | Shin |
| 2008/0198366 | A1 | 8/2008 | LeBlanc |
| 2008/0280374 | A1 | 11/2008 | Potyrailo et al. |
| 2009/0126779 | A1 | 5/2009 | Heeger et al. |
| 2009/0128830 | A1 | 5/2009 | Kottler et al. |
| 2009/0180112 | A1 | 7/2009 | Wang |
| 2009/0262323 | A1 | 10/2009 | Sasaki |
| 2009/0284734 | A1 | 11/2009 | Tang et al. |
| 2009/0291295 | A1 | 11/2009 | Chung et al. |
| 2009/0310745 | A1 | 12/2009 | Banchet et al. |
| 2009/0319225 | A1 | 12/2009 | Mansfield |
| 2010/0004773 | A1 | 1/2010 | Kochergin |
| 2010/0019170 | A1 * | 1/2010 | Hart .................. A61C 5/90 250/459.1 |
| 2010/0171959 | A1 | 7/2010 | Walsh |
| 2010/0195114 | A1 | 8/2010 | Mitsumoto et al. |
| 2010/0239157 | A1 | 9/2010 | O'Dell et al. |
| 2010/0290055 | A1 | 11/2010 | Kim et al. |
| 2010/0292936 | A1 | 11/2010 | Jepsen |
| 2011/0046792 | A1 | 2/2011 | Imes et al. |
| 2011/0089348 | A1 | 4/2011 | Finarov et al. |
| 2011/0194113 | A1 * | 8/2011 | Sakai ................. G01B 11/06 356/432 |
| 2011/0244588 | A1 | 10/2011 | Maity et al. |
| 2011/0299094 | A1 | 12/2011 | Dillon et al. |
| 2012/0133913 | A1 | 5/2012 | Okita |
| 2014/0078514 | A1 | 3/2014 | Zhu |
| 2014/0093985 | A1 | 4/2014 | Li et al. |
| 2014/0204383 | A1 | 7/2014 | Sopori |

FOREIGN PATENT DOCUMENTS

| | | |
|---|---|---|
| JP | 2005038694 | 2/2005 |
| JP | 2005134218 | 5/2005 |

(56) References Cited

FOREIGN PATENT DOCUMENTS

| WO | WO 2011028807 | 3/2011 |
|----|---------------|--------|
| WO | WO 2011042606 | 4/2011 |

OTHER PUBLICATIONS

Bayro-Corrochano, "Review of Automated Visual Inspection 1983-1993 Part I: conventional approaches", Proc. SPIE vol. 2055, Intelligent Robots and Computer Vision XII, Aug. 20, 1993, pp. 128-158.

Cele, "Preparation and Characterization of Nafion-Based Nonocomposite Membranes for Fuel Cell Applications", A thesis submitted to the Faculty of Science and Agriculture; University of Zululand, 2010, pp. 1-195.

Dupuis et al., "Hyperspectral Fourier Transform Spectrometer for Spectral Self-Interference Measurements of Biological Material on Surfaces," Conference proceedings—19th Annual Meeting of the IEEE Lasers and Electro-Optics Society, Oct. 29 through Nov. 2, 2006, Montreal, Quebec, Canada, pp. 306-307.

Dupuis et al., "Time-domain surface profile imaging via a hyperspectral Fourier transform spectrometer," Optics Letters, vol. 33, No. 12, Jun. 15, 2008, pp. 1368-1370.

Hesler, "A study of the surface roughness of the NafionTM membrane in a PEM Fuel Cell", A Major Qualifying Project Report: Submitted to the Faculty of Worcester Polytechnic Institute, Apr. 2009, pp. 1-29.

Jia et al., "Fourier multispectral imaging," Optical Society of America, 2015, 9 pages.

Kini et al., "Effect of Bi alloying on the hole transport in the dilute bismide ally GaAs1-xBix," Physical Review B, vol. 83, Issue 7, Feb. 2011, pp. 075307-1-075307-6.

"NREL Develops Technique to Measure Membrane Thickness and Defects in Polymer Electrode Membrane Fuel Cells", Nov. 15, 2010, 1 page.

Ojanen et al., "Spectral irradiance model for tungsten halogen lamps in 340-850 nm wavelength range", Applied Optics, vol. 49, No. 5, Feb. 10, 2010, pp. 880-886.

Stanfield, "Metrology for Fuel Cell Manufacturing", Jun. 13, 2008.

Stanfield, "VI.3 Metrology for Fuel Cell Manufacturing", FY 2008 Annual Progress Report, DOE Hydrogen Program, pp. 109-1104.

Stanfield, "Metrology for Fuel Cell Manufacturing", Jun. 12, 2010.

Stanfield et al., "Metrology for Fuel Cell Manufacturing", May 12, 2011.

Stanfield et al., "Metrology for Fuel Cell Manufacturing", May 16, 2012.

Sopori, B. "A New Defect Etch for Polycrystalline Silicon", Journal of Electrochemical Society: Solid-State Science and Technology, vol. 131, Issue 3, 1984, pp. 667-672.

Sopori, B. "Principle of a new reflectometer for measuring dielectric film thickness on substrates of arbitrary surface characteristics", Review Science Instruments, vol. 59, Issue 5, May 1988, pp. 725-727.

Sopori, B. "Use of optical scattering to characterize dislocations in semiconductors", Applied Optics, vol. 27, Issue 22, Nov. 15, 1988, pp. 4676-4683.

Sopori et al., "Principles and Applications of Reflectometry in PV Manufacturing," NREL/CP-520-31003, Oct. 2001.

Sopori, B., "Reflectance Spectroscopy: Rapid Quantitative Measurements in Commercial Production of Si Solar Cells", Jan. 2005, NIST, 5 pages.

Takeshi et al., JP 2005038694, "Inspection Method of MEA for polymer Electrolyte Fuel cell (Machine Translation for JP 2005038694", Feb. 10, 2005, 16 pages.

Ulsh et al., "Fuel Cell Membrane Electrode Assembly Manufacturing R&D", NREL, FY10 Annual Progress Report, DOE Hydrogen Program, Jun. 15, 2010, pp. 1127-1130.

PCT/10-33 International Search Report dated Dec. 13, 201.

PCT/10-33 PCT/US11/49111 International Preliminary Report on Patentability dated Feb. 25, 2014.

PCT/10-33 PCT/US11/49111 Written Opinion.

\* cited by examiner

THICKNESS MAPPING USING MULTISPECTRAL IMAGING

CROSS-REFERENCE TO RELATED APPLICATIONS

This application claims the benefit of U.S. Provisional Application No. 62/429,383, filed Dec. 2, 2016, the entire content of which is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Various thin materials may be fabricated and inspected in a high-volume production facility using a continuous, high speed, roll-to-roll system (e.g., a "web-line"). Membranes and other materials manufactured in this fashion may be in the form of a roll of material, with one dimension of the material being much smaller than another dimension. In some examples, material on a roll may have a width of about 6-12 inches and a length of hundreds or even thousands of feet. When a roll is run through a roll-to-roll system, it takes the form of a "web" and two characteristic directions, referred to as a "down-the-web" direction and an "across-the-web" direction, can be distinguished. The web-line may generally keep the membrane or other material in continuous motion at a constant speed and tension.

SUMMARY

In one example, a system includes a material transport system configured to transport a material through a monitoring zone, the material being substantially planar. The system also includes an illumination source configured to illuminate at least a portion of the material that is within the monitoring zone with light and a sensor configured to obtain a plurality of consecutive datasets, wherein a dataset of the consecutive datasets indicates, for each location in a plurality of locations of the material within the at least a portion of the material and for each wavelength in a plurality of wavelengths of light, a respective intensity of the light that is of the wavelength and that is received from the location. The system also includes a processing system in digital communication with the sensor. The processing system includes a processor and is configured to receive the dataset, determine, based on the dataset and for each of at least two locations in the plurality of locations, a respective value of a thickness of the material, and execute, based on the respective value of the thickness of the material for at least one of the at least two locations, a programmatic action.

In another example, a method includes transporting a material through a monitoring zone, the material being substantially planar. The method also includes illuminating at least a portion of the material that is within the monitoring zone with light and obtaining, by a sensor, a plurality of consecutive datasets, wherein a dataset of the consecutive datasets indicates, for each location in a plurality of locations of the material within the at least a portion of the material and for each wavelength in a plurality of wavelengths of light, a respective intensity of the light that is of the wavelength and that is received from the location. The method also includes determining, by a processing system in digital communication with the sensor, based on the dataset, and for each of at least two locations in the plurality of locations, a respective value of a thickness of the material, and outputting, by the processing system, the respective value of the thickness of the material for each of the at least two locations.

DETAILED DESCRIPTION

The techniques of the present disclosure may allow for non-contact thickness mapping of membranes and similar materials, such as those running through a roll-to-roll industrial system. For instance, the techniques described herein may utilize multispectral imaging and/or spectral interference fringe analysis to quickly acquire a two-dimensional map of thickness of a membrane roll. Such thickness information can then be monitored in real-time or near real-time for quality control purposes. As referred to herein, "multispectral imaging" may refer to imaging that captures more than one spectrum value. That is, while the term multispectral imaging is used herein, the term hyperspectral imaging may be equally applicable.

Related-art single-point thickness probes that utilize spectral interference fringe analysis have been demonstrated. When a material is in motion (e.g., on a web-line), such related art methods may permit inspection along a single line of the material. For instance, the line may run parallel to the edges of the web, such as when the detector is stationary, or may run in a zig-zag pattern, such as when the detector is configured to move periodically in an across-the-web direction.

In contrast, by utilizing, for example, a push-broom multispectral camera, the techniques of the present disclosure may allow for hundreds or thousands of points (e.g., located along a line spanning in the across-the-web direction) to be simultaneously inspected. Such line acquisitions may be repeated continuously as the membrane travels (e.g., in a down-the-web direction). Consequently, full area, high resolution, two-dimensional inspection (referred to herein as "thickness mapping") may be achieved. Additionally, by using spectral interference fringe methods described herein, thicknesses of one or more layers of multilayer structures may be determined. For example, the techniques of the present disclosure may be used to map the thickness of a membrane that is coated on a substrate, or a membrane that is sandwiched between two protective layers.

Figure 1:
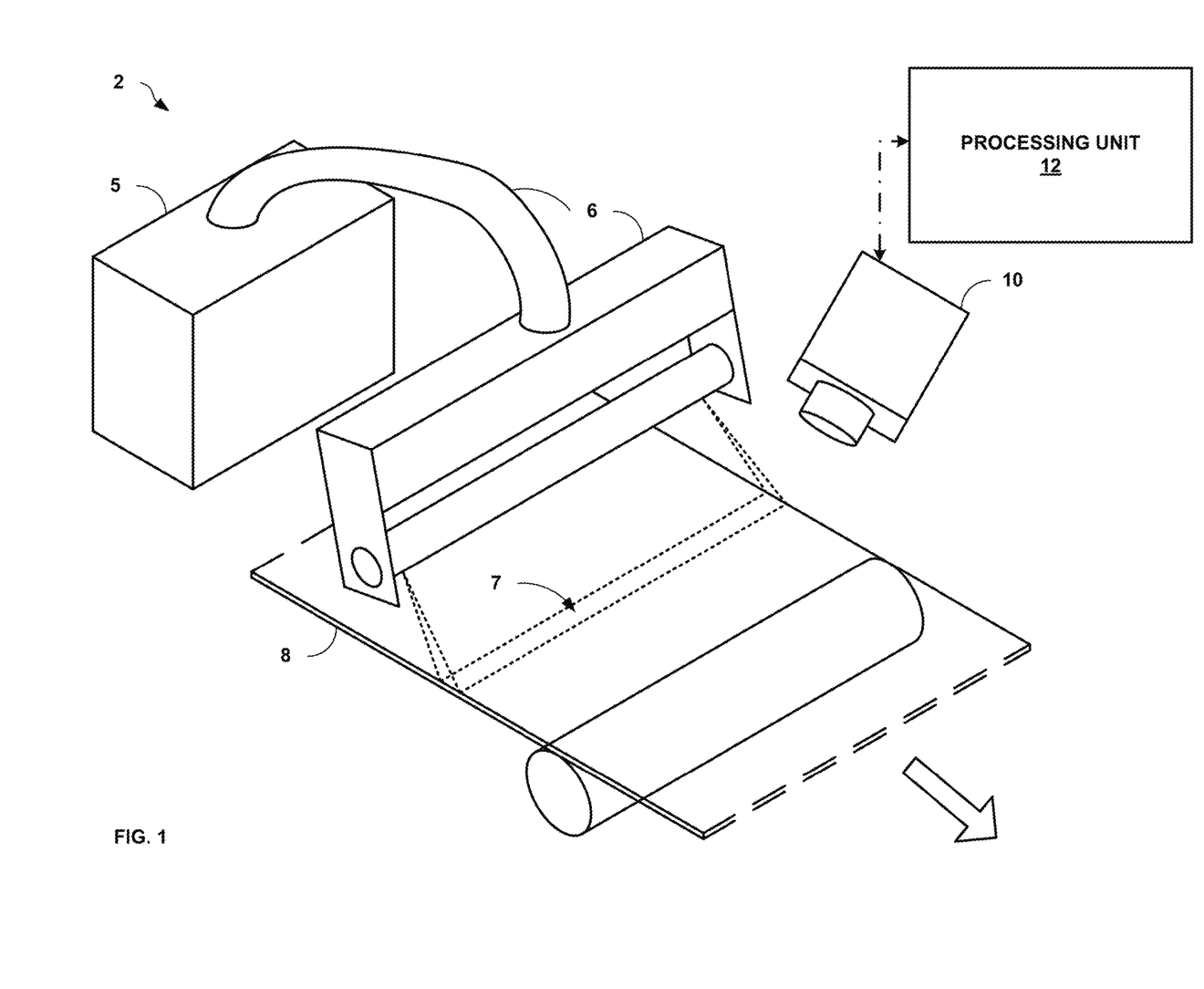
FIG. 1 is a conceptual diagram illustrating one example of a system configured to perform thickness mapping using multispectral imaging, in accordance with one or more aspects of the present disclosure.

FIG. 1 is a conceptual diagram illustrating one example of a system (e.g., system 2) configured to perform thickness mapping using multispectral imaging, in accordance with one or more aspects of the present disclosure. In the example of FIG. 1, system 2 may be configured to map the thickness of a membrane (e.g., membrane 8) in accordance with the techniques described herein. As shown in the example of FIG. 1, system 2 includes light 5, light guide and focusing optics 6, sensor 10, and processing unit 12. Light 5 and light guide and focusing optics 6 may be collectively referred to as "illumination source 4". System 2 represents only one example of a system configured to perform thickness mapping using multispectral imaging. Other systems that include fewer components, more components, and/or different components, and/or systems that have components arranged differently, may also be used to perform thickness mapping using multispectral imaging in accordance with the techniques described herein.

In the example of FIG. 1, light 5 is configured to emit light (e.g., radiation) for illumination of membrane 8. In the example of FIG. 1, for instance, light 5 may be one or more broadband light emitting diodes (LEDs) or a tungsten-halogen lamp. In various examples, light 5 may be any suitable visible light source (e.g., that emits light in the visible spectrum), any suitable ultraviolet (UV) light source, or any suitable infrared (IR) light source. In some examples, light 5 may be a light source that emits light in a combination of two or more of these wavelength ranges, or any other light source usable in accordance with the techniques described herein.

In the example of FIG. 1, light guide and focusing optics 6 are configured to direct light from light 5 at a particular portion of membrane 8. That is, focusing optics 6 may be used to ensure efficient use of light emitted by light 5 ensuring that substantially all the light is directed at the portion of membrane 8 needing illumination. For instance, in the example of FIG. 1 focusing optics 6 may include a fiber optic cable with linear output, and a cylindrical lens. The fiber optic cable of focusing optics 6 may receive light from light 5 and provide the light to the cylindrical lens. The cylindrical lens may focus the light onto a narrow rectangle of membrane 8 (e.g., illuminated area 7), spanning in the across-the-web direction. In some examples, illuminated area 7 may span across the entire web. In some examples, illuminated area 7 may constitute some other suitable portion of membrane 8. While including a fiber optic cable and cylindrical lens in the example of FIG. 1, focusing optics 6 may, in other examples, represent any other suitable means for focusing light emitted from light 5 onto a particular portion of membrane 8, such as one or more mirrors, one or more lenses, one or more prisms, or some combination of such devices.

In the example of FIG. 1, membrane 8 is a membrane used in fuel cell applications. For instance, membrane 8 may be a polymer layer. The thickness of membrane 8 may be between about 5 to about 70 microns. In other examples, however, membrane 8 may be any other type of thin, semi-transparent material.

In some examples, membrane 8 may be mechanically fragile. While shown as a single layer in FIG. 1, membrane 8 may, in some examples, be cast on a substrate (not shown), such as a layer of a relatively thicker and/or stronger polymer. In some examples, membrane 8 may additionally or alternatively be protected (not shown) by a relatively thinner liner (e.g., on the top side of membrane 8). In other words, in various examples, the material under investigation may be at least loosely integrated with or attached to at least one or more other layers.

In accordance with the techniques described herein, the thickness of membrane 8 may be determined even when membrane 8 is combined with one or more other layers. Thus, in examples in which membrane 8 is cast on a substrate and/or is protected by a liner, the thickness of membrane 8 may be determined before or after removal of the substrate and/or protective liner. Layers under inspection may be at least partially transparent to the type of radiation (e.g., light) used to illuminate the layers. In the example of FIG. 1, for instance, membrane 8 may be at least partially transparent to the light emitted by light 5.

In the example of FIG. 1, sensor 10 is configured to receive light from membrane 8 and provide information about the received light to processing unit 12. Specifically, sensor 10 may be configured to receive reflectance or transmittance spectra for points located along illuminated area 7 of membrane 8 and provide spectral imaging data to processing unit 12. As one example, sensor 10 may be a multispectral camera.

While shown in the example of FIG. 1 as being on the same side of membrane 8 as illumination source 4, sensor 10 may, in other examples, be located on the opposite side of membrane 8. When located on the same side of membrane 8, sensor 10 may be configured to receive reflectance spectra (e.g., light that is reflected off of membrane 8), thus operating in "reflectance mode." When located on the opposite of membrane 8, sensor 10 may be configured to receive transmittance spectra (e.g., light that passed through membrane 8), thus operating in "transmittance mode."

In the example of FIG. 1, processing unit 12 is configured to receive the spectral imaging data from sensor 10 and process the data. In the example of FIG. 1, processing unit 12 may be hardware that executes firmware and/or software to perform some or all of any of the techniques described herein. As one example, processing unit 12 may be a processor or other computing device that continuously executes software to receive data acquired by sensor 10, determine, based on the received data, a thickness profile for membrane 8, and generates an alarm if the thickness profile doesn't satisfy particular thresholds. In some examples, processing unit 12 may additionally and/or alternatively store thickness profiles in computer memory or storage (not shown). Using a set of stored thickness profiles acquired when a membrane was in motion, processing unit 12 may generate a global, two-dimensional (2D) thickness map, in which one dimension corresponds to the down-the-web direction and the other dimension corresponds to the across-the-web direction. In some examples, processing unit 12 may perform additional and/or other processing.

In some examples, processing unit 12 may operate to determine thickness information in real time or near-real time. That is, processing unit 12 may be capable of processing received spectral imaging data at the same rate as or faster than sensor 10 can generate the data. In some examples, processing unit 12 may be an "off-line" configuration, in which the spectral imaging data from sensor 10 is stored (e.g., in computer memory or storage) and then processed in an off-line fashion. The techniques described herein may be used to determine material thickness when using a real time or near-real time processing unit as well as when using an off-line processing unit. Further details regarding the operation of processing unit 12 are described below with respect to FIGS. 2-10.

Figure 2:
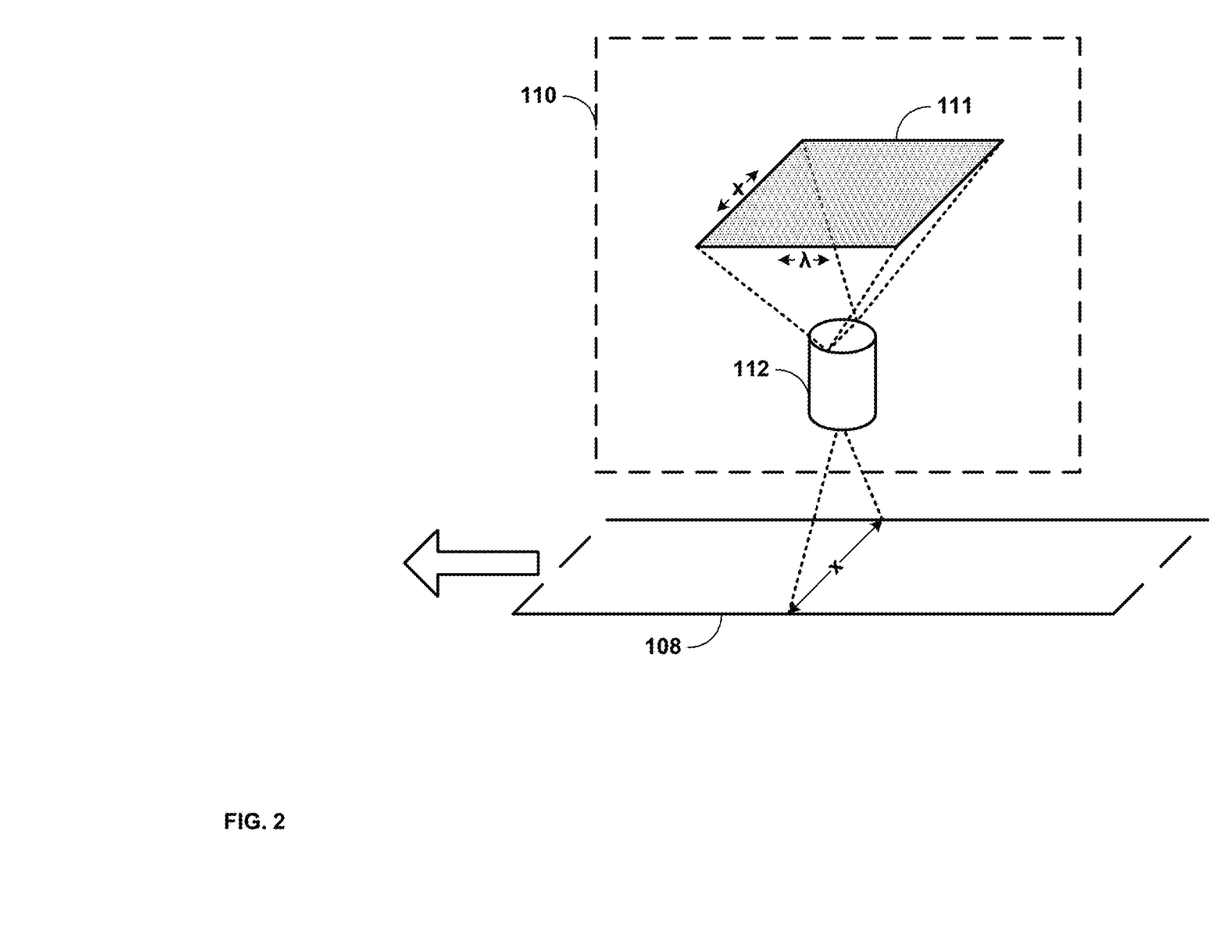
FIG. 2 is a conceptual diagram illustrating one example of a sensor configured to receive reflectance or transmittance spectra for points located along an illuminated section of a membrane, in accordance with one or more aspects of the present disclosure.

FIG. 2 is a conceptual diagram illustrating one example of a sensor (e.g., sensor 110) configured to receive reflectance and/or transmittance spectra for points located along an illuminated section of a membrane (e.g., membrane 108), in accordance with one or more aspects of the techniques described herein. For instance, in the example of FIG. 2, sensor 110 represents a push-broom multispectral camera. A push-broom multispectral camera may include a 2D detector (e.g., detector 111) and optics (e.g., optics 112). In the example of FIG. 2, optics 112 may include dispersive optics and a focusing lens. One example of dispersive optics may include a slit and dispersive grating.

Figure 3A:
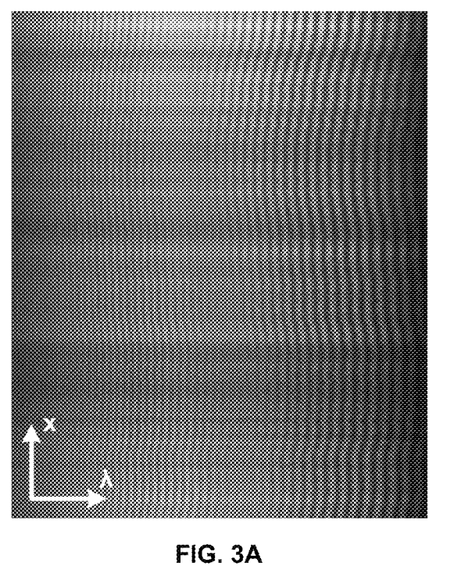
FIGS. 3A and 3B are photographs illustrating example images used to perform thickness mapping using multispectral imaging, in accordance with one or more aspects of the present disclosure.
Figure 3B:
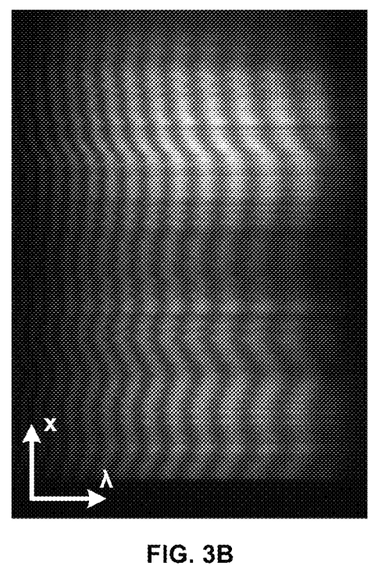

Sensor 110 may be used to acquire 2D digital images at a set framerate. For instance, sensor 110 may be used to acquire the 2D multispectral images shown in FIGS. 3A and 3B, described below. That is, FIGS. 3A and 3B are photographs illustrating example multispectral camera images, in accordance with one or more aspects of the present disclosure. Each 2D image created by sensor 110 may represent light reflected and/or transmitted by a single line (e.g., in the across-the-web direction) of the membrane being evaluated. One dimension of each 2D image may represent a spatial axis in the across-the-web direction. This dimension is indicated in FIGS. 2, 3A, and 3B as "x". The other dimension may represent a spectral axis. This dimension is indicated in FIGS. 2, 3A, and 3B as "$\lambda$".

For each pixel in a 2D image generated by sensor 110, a value proportional to light intensity at the corresponding position and wavelength, I(x,$\lambda$), is recorded. By taking one row (e.g., at a first location, x=$x_0$) from the image, a spectrum plot, I($\lambda$)=I($x_0$, $\lambda$), for a given point on the membrane may be generated. Through a calibration of values on the spectral axis, a specific wavelength and wavenumber value can be assigned to each column in the 2D image.

When light interacts with a membrane, a known phenomenon of light interference takes place. The spectrum of the light that is reflected by or transmitted through the membrane may include characteristic oscillations in intensity. Such oscillations may be seen in FIGS. 3A and 3B as repetitive light to dark to light transitions.

FIGS. 3A and 3B are photographs illustrating example images used to perform thickness mapping using multispectral imaging, in accordance with one or more aspects of the present disclosure. In FIG. 3A, the oscillations are at a higher frequency, as the transitions are relatively narrow. In FIG. 3B, the oscillations are at a lower frequency, as the transitions are relatively wider. The frequency of such oscillations generally depends on the thickness of the membrane and the refractive index of the material from which the membrane is made. Therefore, if the refractive index is known or measured using some other known method, the thickness of the membrane may be determined based on the oscillations (also referred to herein as "interference fringes") in the spectrum of reflected or transmitted light.

In some examples, values of light intensity, I, from the 2D images produced by sensor 110 may be converted (e.g., by a processing unit, such as processing unit 12 of FIG. 1) to reflectance, R, or transmission, T, values using various known methods. In some examples, 100% (also referred to herein as "white") and dark reference images may be used. Converting the light intensity to reflectance and/or transmission values may be particularly useful in certain examples, depending on the uniformity of the light shining on the membrane, the sensitivity of the sensor, and the illumination spectrum. In some examples, thickness may be determined using the raw light intensity values themselves. That is, in some examples, light intensity values may not be converted to reflectance or transmission values.

Sensor 110, as shown in the example of FIG. 2, may transmit images, such as those in FIGS. 3A and 3B or other images, to a processing unit (e.g., processing unit 12 of FIG. 1) for thickness determination and/or other analysis. In various examples, the transmitted images may indicate light intensity, reflectance values, and/or transmission values.

Figure 4:
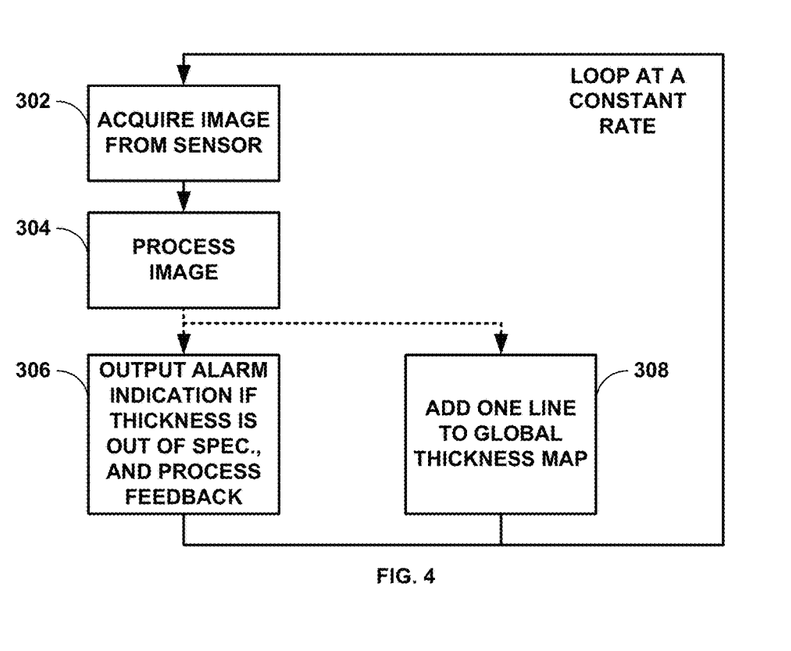
FIG. 4 is a flow diagram illustrating example operations for performing thickness mapping using multispectral imaging, in accordance with one or more aspects of the present disclosure.

FIG. 4 is a flow diagram illustrating example operations for performing thickness mapping using multispectral imaging, in accordance with one or more aspects of the present disclosure. FIG. 4 is described below within the context of the example of FIG. 1. For example, the operations shown in FIG. 4 may be performed by one or more components of system 2. In other examples, however, one or more of the operations shown in FIG. 4 may be performed by one or more other devices or components.

In the example of FIG. 4, system 2 may acquire an image from a sensor (302). For instance, processing unit 12 may acquire an image (e.g., mathematically represented as I(x,$\lambda$)) from sensor 10. The image may be a 2D multispectral image, as described herein, with one dimension representing spectral values ($\lambda$) and the other dimension representing location values (x) on a material being analyzed (e.g., in an across-the-web direction). Each point, I($x_n$,$\lambda_m$), on the acquired image may represent the intensity of light reflected and/or transmitted by material at the respective point $x_n$ and of the respective wavelength $\lambda_m$.

System 2 may process the image (304). For example, processing unit 12 may determine, based on the image, and for each location value (e.g., corresponding to a row of pixels in the image I($x_n$,$\lambda$)), a respective thickness value, t($x_n$). Additional details and variations of image processing are described below with respect to FIGS. 5 and 10.

In some examples, system 2 may output an alarm indication if a thickness value is outside of specifications (306). For example, processing unit 12 may determine whether each thickness value meets one or more thresholds, and output an alarm indication if one or more thickness values exceeds one or more of the thresholds. Example thresholds may represent a minimum thickness value and/or a maximum thickness value. Such threshold thickness values may include static values (e.g., defined by a user or other entity beforehand), dynamic values (e.g., a rolling average of recent thickness values plus or minus an offset), or a combination of the two.

Processing unit 12 may output the alarm indication to another computerized system or device, to a user interface device, or elsewhere. Examples of other computerized systems to which processing unit 12 may output the alarm indication may include a manufacturing management system, an electrical breaker system, and others. Examples of user interface devices may include a monitor, a speaker, a pager, a cellular telephone or smartphone, or any other device capable of conveying information to a user.

Processing unit 12 may process any feedback received as a result of outputting the alarm indication. In various examples, processing the feedback may include recording an indication of the alarm, stopping the production facility, outputting an indication of the location of the thickness value or values that caused the alarm indication, or other processing.

In some examples, system 2 may add one line to a global thickness map (308). For example, processing unit 12 may append a single row of pixels to an image that displays all of the recorded thickness values so far. The stored image may then be used for analysis, testing, certification, or other purposes.

In the example of FIG. 4, operations 306 or 308 may be optional. That is, in some examples system 2 may only perform operation 306 or operation 308, but not both. In other examples, system 2 may perform both operation 306 and operation 308. After performing operations 306 and/or 308, system 2 may repeat the process by acquiring another image from the sensor.

In this way, system 2 may continually monitor the thickness of a material. System 2 may create a global thickness map of the material and/or output an alarm indication if the thickness of the material does not meet particular threshold values. By continuously performing the techniques described herein on numerous points over the entire material web, more accurate web thickness may be achieved.

Figure 5:
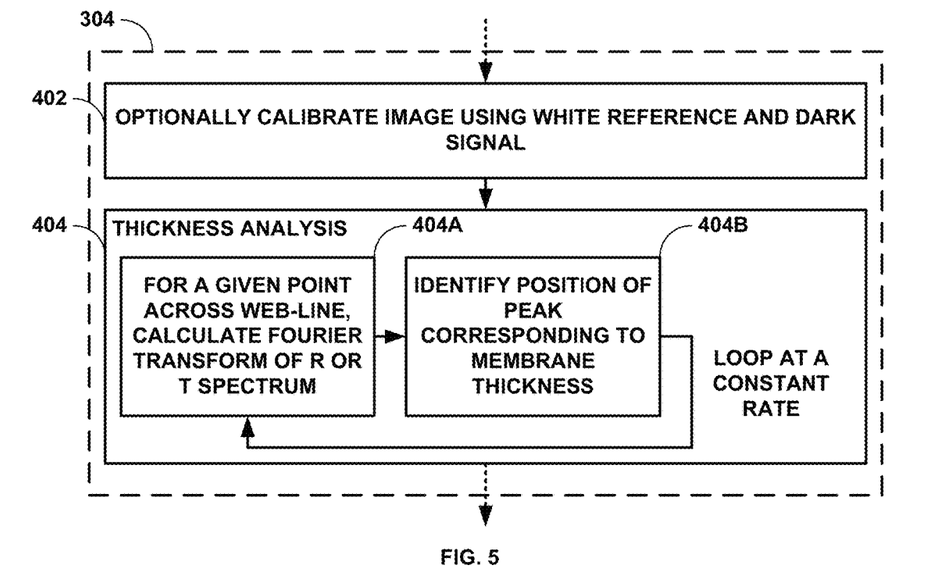
FIG. 5 is a flow diagram illustrating example details of the operations of FIG. 4, in accordance with one or more aspects of the present disclosure.

FIG. 5 is a flow diagram illustrating example details of the operations of FIG. 4, in accordance with one or more aspects of the present disclosure. FIG. 5 is described below within the context of the example of FIG. 1. For example, the operations shown in FIG. 5 may be performed by one or more components of system 2. In other examples, however, one or more of the operations shown in FIG. 5 may be performed by one or more other devices or components.

In operation 304 of the main processing "loop" shown in FIG. 4, the image $I(x, \lambda)$ acquired by the sensor is processed to obtain a thickness profile, $t(x)$. FIG. 5 describes additional details of this operation. Specifically, FIG. 5 includes an optional data calibration operation 402 and thickness analysis loop operation 404 that iterates over the spatial axis, x.

A raw image, $I(x, \lambda)$, acquired by a hyperspectral sensor is uncalibrated. It may depend not only on the reflectance/transmission properties of the object being imaged, but also on other characteristics of the imaging system such as: a wavelength- or pixel-dependent spectral response of the sensor, a wavelength- or position-dependent light source intensity, nonuniformity of optical elements, or other system characteristics. To correct for any undesirable inconsistencies, processing unit 12 may perform a calibration of the raw image, I. As one example, processing unit 12 may apply the following formula:

$$R \text{ (or } T) = (I-D)/(W-D),$$

where R and T denote a reflectance-based or transmission-based image, respectively, D is a dark image obtained when the light source was off, and W is so-called 100% response (also referred to herein as a white image). For a reflectance-based image, the 100% response represents an image that is acquired when the object being imaged is replaced by a mirror. For a transmittance-based image, the 100% response represents an image that is acquired when the object being imaged is removed. The images representing D and W response may only need to be acquired once before normal operation of system 2 as described herein, and may be used in processing of all images obtained during actual scanning of a material of interest. In some examples, smoothing and averaging may also be carried out on D and W to reduce noise of the calibrated images.

In the example of FIG. 5, as part of the loop operation, for each position across the web-line (i.e., for each x), processing unit 12 may analyze a corresponding spectrum using Fourier transform (404A) and a peak finding procedure (404B). The position of the peak in the generated Fourier transform determines the measured membrane thickness at the given point.

As described herein, the optional calibration can be performed to convert the light intensity $I(x, \lambda)$ into reflectance, $R(x, \lambda)$, or transmittance, $T(x, \lambda)$. This conversion may compensate for illumination source spatial and/or spectral variations and/or for the fact that detectors may exhibit a non-constant (e.g., strongly wavelength-dependent) sensitivity.

As one concrete example, assume system 2 is operating in reflectance mode (e.g., sensor 10 is positioned on the same side of membrane 8 as illumination source 4). After calibration (402), a matrix of reflectance values for points across the web line, $R(x, \lambda)$, is obtained. The R matrix may then be processed, point by point, in a loop (404) where a spectrum, $R(\lambda)$, for each point along x is analyzed separately.

Various related-art methods have been proposed to determine membrane thickness, t, based on a reflectance spectrum $R(\lambda)$. In the most general case, a processing system may develop an optical model of single layer or multilayer structures and fit the model parameters until the predicted and measured spectra match. Because the optical models are typically non-linear, such general fitting procedure can be time consuming and very difficult to implement in real time or near-real time systems. However, in a special case when the refractive index, k, of a membrane is known and approximately constant in the wavelength range of interest, the thickness determination operations may be significantly simplified. For example, in the case of a commercially available Nafion™ membrane, such as those produced by The Chemours Company of Wilmington, Del., the refractive index may change very little within the entire near-infrared (NIR) range (e.g., 0.9 to 1.7 eV). Consequently, a much simpler, but at the same time much faster, thickness determination procedure can be utilized for Nafion™ and/or similar materials.

The simplified determination procedure may be carried out as follows. Processing unit 12 may define $k=1/\lambda$. As a result, the $R(\lambda)$ spectrum may be converted to express the reflectance values in terms of the wavenumber, k, to obtain $R(k)$. Switching to wavenumber, k, may cause the interference fringes to become more uniform (assuming that the refractive index, n, is approximately constant). Next, to find the interference fringe frequency, processing unit 12 may numerically determine a discrete Fourier transform, DFF, of the R(k) spectrum (404A of FIG. 5). This results in a series of complex numbers that constitute the frequency domain representation of the original reflectance values. In other words, the R spectrum is decomposed into a series of frequencies, and from the physics of the interference effect, it is known that each frequency corresponds to a well-defined thickness.

Figure 6:
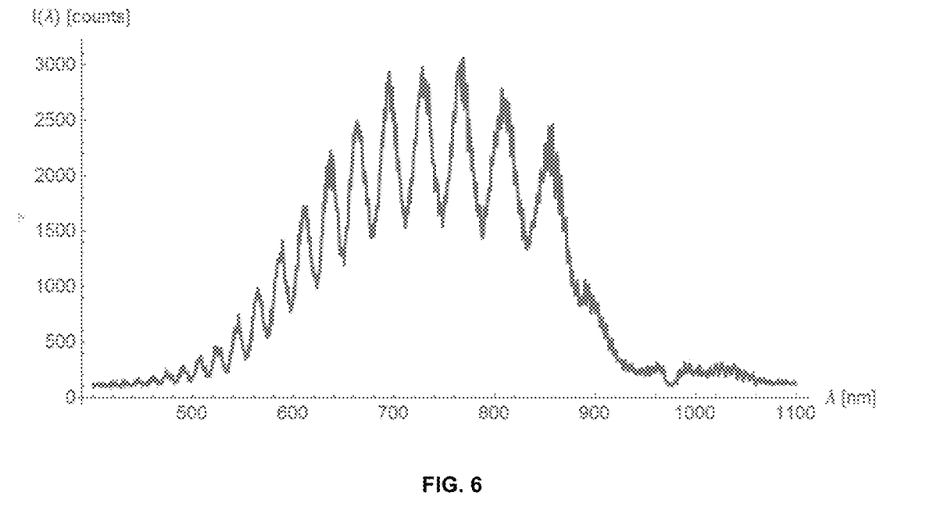
FIG. 6 is a graphical plot illustrating an example spectrum that may represent a single position in an image used to perform thickness mapping using multispectral imaging, in accordance with one or more aspects of the present disclosure.
Figure 7:
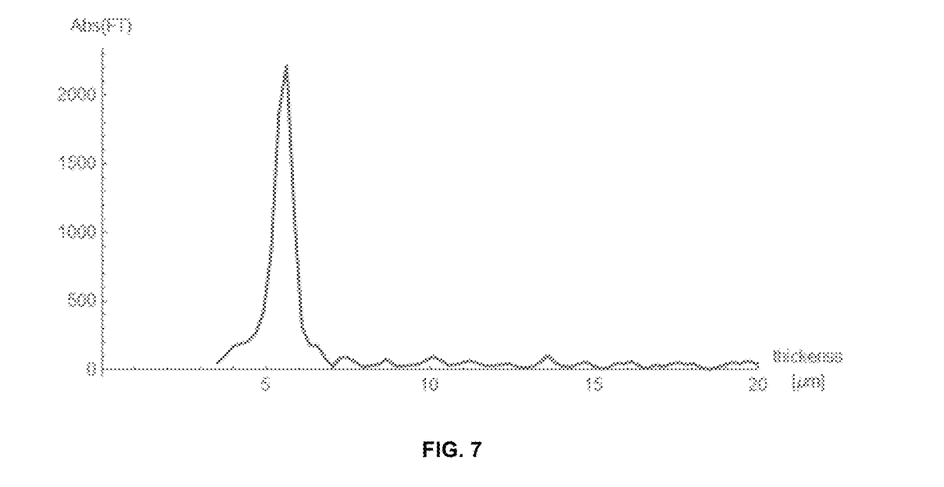
FIG. 7 is a graphical plot illustrating the Fourier transform for the example spectrum of FIG. 6.

FIG. 6 is a graphical plot illustrating an example spectrum corresponding to a single position in an image used to perform thickness mapping using multispectral imaging, in accordance with one or more aspects of the present disclosure. FIG. 7 is a graphical plot illustrating the Fourier transform for the example spectrum of FIG. 6. In the example of FIG. 7, the x-axis depicts the thickness values (in micrometers) that correspond to each respective frequency. When a reflectance spectrum (e.g., R(k)) contains interference fringes, the plot of the Fourier transform will include a characteristic peak, as observed in FIG. 7.

Processing unit 12 may then find the peak and, based on the peak's location, determine a respective thickness of the membrane for the location on the membrane (404B of FIG. 5). Numerical methods to detect peaks in data are well established. Using actual data for a given material, various known algorithms for peak detection can be optimized for use. As one simple example, a peak may be found by seeking an absolute maximum of the data. This may be useful, for instance, in the case of the image shown in FIG. 7. In more complicated cases (e.g., the image shown in FIG. 8), both the height and width of local maximums may be analyzed to separate actual interference peaks from experimental noise.

Figure 8:
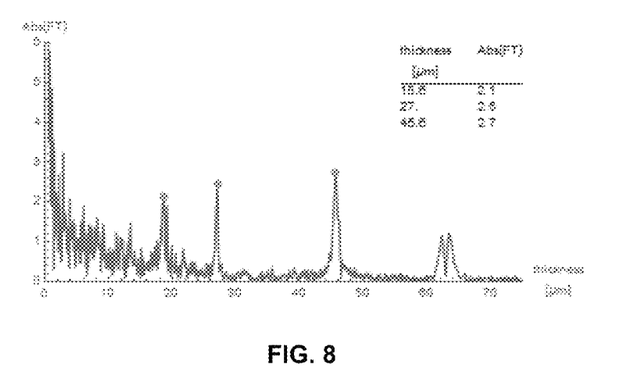
FIG. 8 is a graphical plot illustrating the Fourier transform of another example spectrum.

FIG. 8 is a graphical plot illustrating the Fourier transform of another example spectrum. In the example of FIG. 8, the material under investigation may be a multilayer structure. For example, the material under investigation may be a membrane that is sandwiched between two protective layers. As shown in FIG. 8, the Fourier transform may contain more than one peak. In such examples, a processing unit (e.g., processing unit 12 of FIG. 1) may perform a selection of the peak corresponding to a specific layer (membrane).

In some examples, corresponding a specific peak with a specific layer may be based on parameters determined beforehand. For example, an operator or other individual skilled in the field may review and interpret an analyzed sample of the material under test and determine that a peak in a certain thickness range corresponds to a particular layer of the sample. With reference to FIG. 8, for instance, the multiple peaks correspond to interference effects which can potentially occur between all interfaces and surfaces present in the sample. Specifically, FIG. 8 shows response from 2 mils thick Nafion™ film sandwiched between a thin protective layer on the top and a thick support at the bottom. Thus, there are two internal interfaces (protective later to Nafion™ and Nafion™ to support) and a top and bottom surface. Consequently, up to six interference peaks can be expected. Considering the known structure of the sample, the first peak at 18.6 microns can be assigned to the top protective layer. The second peak at 27.0 microns can be determined to represent thickness of the Nafion™ film and the third peak at 45.6 microns can be determined to result from the first two layers combined. By assuming that the membrane (e.g., the material whose thickness is desired) has a thickness greater than 18.6 microns, then it is always the second peak that represents the actual membrane thickness.

Based on such initial analysis, a processing unit may be configured to determine, as the peak corresponding to the layer whose thickness is desired, the first peak greater than about 19 microns. As another example, the processing unit may be configured to determine, as the relevant peak, any peak between about 20 microns and about 35 microns. In other words, when determining thickness of a specific layer in a multi-layer structure, the processing unit may be configured to determine the thickness using peak detection only within a specified range of corresponding thickness values, based on known or measured criteria of layers in the multi-layer structure.

In a typical quality control system the techniques described herein may be repeated for hundreds or thousands of points in the across-the-web direction, and multiple times per second. To further reduce computational complexity, a more specialized version of the techniques is described below. The following techniques may increase the speed at which each thickness may be determined, thereby enabling faster processing of material webs and thus faster production.

Figure 9:
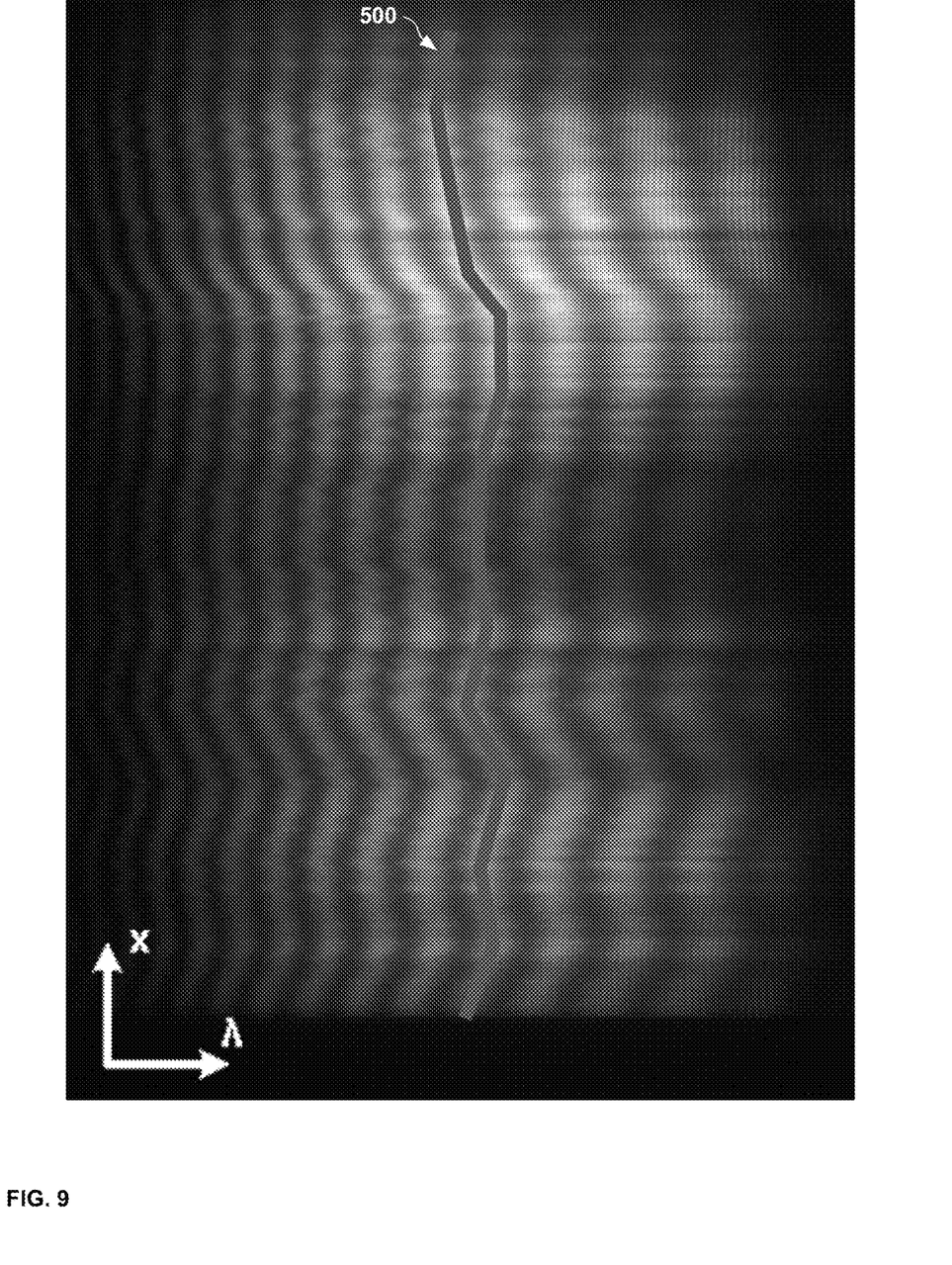
FIG. 9 is a photograph illustrating another example image used to perform thickness mapping using multispectral imaging, in accordance with one or more aspects of the present disclosure.

In experiments performed using Nafion™ films, it was observed that, even when the membrane is on a substrate, the interference fringes captured by the sensor (e.g., sensor 10 of FIG. 1) were sometimes dominated by one strong frequency. FIGS. 3A and 3B may be examples of such a phenomenon. A strong frequency presence could suggest that the membrane is mainly responsible for the captured interference and that the presence of a substrate has little effect on the acquired image. Under this assumption, then, a single ridge of high intensity signal, spanning in the across-the-web direction, may be identified, as depicted in FIG. 9, and a different method for finding membrane thickness profile can be used as described below.

Figure 10:
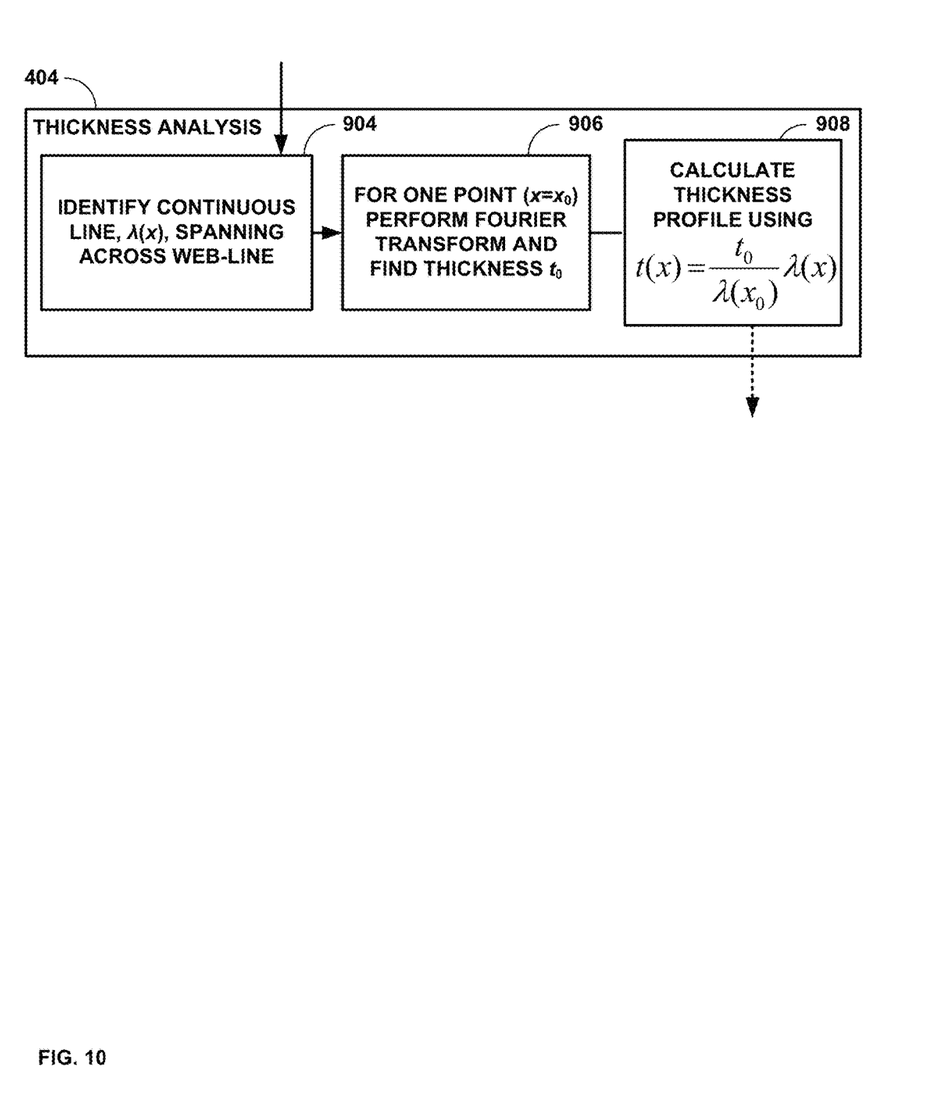
FIG. 10 is a flow diagram illustrating example details of the operations of FIGS. 4 and/or 5, in accordance with one or more aspects of the present disclosure.

FIG. 10 is a flow diagram illustrating example details of the operations of FIGS. 4 and/or 5, in accordance with one or more aspects of the present disclosure. FIG. 10 is described below within the context of the examples of FIG. 1 and FIG. 9. For example, the operations shown in FIG. 10 may be performed by one or more components of system 2. In other examples, however, one or more of the operations shown in FIG. 10 may be performed by one or more other devices or components.

FIG. 10 describes details of another method for performing thickness analysis on the image I(x, λ) acquired by the sensor to determine a thickness profile t(x). In the example of FIG. 10, system 2 may identify a continuous line spanning across the web-line (904). For example, processing unit 12 may analyze the image shown in FIG. 9 and identify signal ridge 500. Signal ridge 500 may correspond to a high intensity signal and may represent one specific constructive interference condition. Signal ridge 500 can be described mathematically as λ(x). In some examples, a low intensity signal (e.g., a "dark" line, as seen in FIG. 9) may be used instead of a high intensity signal.

System 2 may perform a Fourier transform analysis for one value of $x=x_0$ to obtain a thickness, $t_0$ (906). For instance, system 2 may perform operations 404A and 404B of FIG. 5 to determine $t_0$. In the example of FIG. 10, rather than iterating to the next value of x and performing another Fourier transform, system 2 may utilize the determined thickness and signal ridge 500 to estimate the thickness profile of the other values of x (908). For instance, system 2 may determine the thickness t(x) for a point x by multiplying the determined thickness to by a ratio $\lambda(x)/\lambda(x_0)$. That is, $$t(x) = \frac{t_0}{\lambda(x_0)} \lambda(x) \qquad (1)$$

In some examples, there may be no single continuous line, λ(x), for all values of x in the investigated image. For example, a sharp change in membrane thickness may make the λ(x) line discontinuous. In such case the method described in the example of FIG. 10 may analyze each continuous section separately. That is, in some examples, a Fourier transform may be performed once for each continuous section. As a result, this method may allow for faster web-line movement as system 2 performs a Fourier transform fewer times, thus allowing for nearer-to-real time operation.

The following are two examples of pseudocode that may be used in accordance with one or more aspects of the techniques described herein.

Pseudocode Example 1

```
Calibrate wavelength axis for the system
Obtain white reference and dark
For each image, I(x, λ), acquired from sensor do
    Optionally calibrate raw light intensity I(x, λ) to get reflectance
    image R(x, λ)
    For each x0 ranging from 1 to xmax do
        Calculate Fourier transform of R(x0, k(λ)) spectrum
        Find peak in the calculated Fourier transform
        Peak position after scaling gives the membrane thickness
        Collect individual points to generate thickness profile t(x)
        Analyze the profile to check if it meets the thickness
specification requirements and, if desired, output an out-of-
specification indication to the user
    Collect all thickness profiles to generate thickness map
```

Pseudocode Example 2

```
Calibrate wavelength axis for the system
Obtain white reference and dark
For each image, I(x, λ), acquired from sensor do
    Optionally calibrate raw light intensity I(x, λ) to get reflectance
    image R(x, λ)
    Identify one high signal ridge in the R image
    Calculate Fourier transform of R(x0, k(λ)) spectrum for one
    position x=x0
    Find peak in the calculated Fourier transform
    Peak position after scaling gives the membrane thickness t0 at x0
    Calculate thickness profile t(x) using equation 1
    Analyze the profile to check if it meets the thickness specification
    requirements
Collect all thickness profiles to generate thickness map
```

One or more of the techniques described herein may additionally or alternatively be described by the following examples.

Example 1

A system comprising: a material transport system configured to transport a material through a monitoring zone, the material being substantially planar; an illumination source configured to illuminate at least a portion of the material that is within the monitoring zone with light; a sensor configured to obtain a plurality of consecutive datasets, wherein a dataset of the consecutive datasets indicates, for each location in a plurality of locations of the material within the at least a portion of the material and for each wavelength in a plurality of wavelengths of light, a respective intensity of the light that is of the wavelength and that is received from the location; and a processing system in digital communication with the sensor, wherein the processing system comprises a processor and is configured to: receive the dataset, determine, based on the dataset and for each of at least two locations in the plurality of locations, a respective value of a thickness of the material, and execute, based on the respective value of the thickness of the material for at least one of the at least two locations, a programmatic action.

Example 2

The system of example 1, wherein: the processing system is configured to determine the respective value of the thickness of the material for each of the at least two locations by: transforming, for a first location of the at least two locations, a signal made up of the respective intensity of the light for the first location and for the plurality of wavelengths of light into a respective function in a frequency domain; determining a respective amplitude value of the respective function; and determining, based on the respective amplitude value, the respective value of the thickness of the material for the first location.

Example 3

The system of any of examples 1 or 2, wherein: the processing system is configured to determine the respective value of the thickness of the material for each of the at least two locations by: determining a signal ridge in the dataset; transforming, for a first location of the at least two locations, a signal made up of the respective intensity of the light for the first location and for the plurality of wavelengths of light into a respective function in a frequency domain; determining a respective amplitude value of the respective function; determining, based on the respective amplitude value, the respective value of the thickness of the material for the first location; and determining the respective value of the thickness of the material for a second location of the at least two locations based on the respective value of the thickness of the material for the first location, a value of the respective intensity of the light for the first location and for the plurality of wavelengths of light that corresponds to the signal ridge, and a value of the respective intensity of the light for the second location and for the plurality of wavelengths of light that corresponds to the signal ridge.

Example 4

The system of any of examples 1-3, wherein the processing system is further configured to, prior to determining the respective value of the thickness of the material for each of the at least two locations, calibrate the dataset based on at least one of: a dark dataset that is obtained by the sensor while the illumination source is inactivated and a white dataset that is obtained by the sensor with approximately no loss of light from the illumination source.

Example 5

The system of example 4, wherein calibrating the dataset comprises: subtracting, from values of the dataset, corresponding values of the dark dataset to produce a dark offset dataset; subtracting, from values of the white dataset, the corresponding values of the dark dataset to produce a total offset dataset; and dividing values of the dark offset dataset by corresponding values of the total offset dataset to produce a calibrated dataset.

Example 6

The system of any of examples 1-5, wherein the sensor comprises a multispectral camera.

Example 7

The system of example 6, wherein the plurality of consecutive datasets comprises a plurality of consecutive two-dimensional (2D) images in which a first dimension corresponds to location of the material and a second dimension corresponds to wavelength of light.

Example 8

The system of any of examples 1-7, wherein the processing system is configured to execute the programmatic action by: determining whether the respective value of the thickness of the material for either of the at least two locations is within a defined range of thickness values; and responsive to determining that the respective value of the thickness of the material for a particular location in the at least two locations is not within the defined range of thickness values, performing at least one of: outputting an indication of the respective value of the thickness of the material for the particular location, activating an alarm configured to notify an operator of the system, or halting the material transport system.

Example 9

The system of any of examples 1-8, wherein the processing system is configured to execute the programmatic action by outputting, for display at a display device, an indication of the respective value of the thickness of the material for the at least one of the at least two locations.

Example 10

The system of any of examples 1-9, wherein: the illumination source is disposed on a first side of the substantially planar material, and the sensor is disposed on a second side of the substantially planar material, opposite the first side, such that the plurality of consecutive datasets represent light transmitted through the substantially planar material.

Example 11

The system of any of examples 1-9, wherein: the illumination source is disposed on a first side of the substantially planar material, and the sensor is disposed on the first side of the substantially planar material such that the plurality of consecutive datasets represent light reflected by the substantially planar material.

Example 12

A method comprising: transporting a material through a monitoring zone, the material being substantially planar; illuminating at least a portion of the material that is within the monitoring zone with light; obtaining, by a sensor, a plurality of consecutive datasets, wherein a dataset of the consecutive datasets indicates, for each location in a plurality of locations of the material within the at least a portion of the material and for each wavelength in a plurality of wavelengths of light, a respective intensity of the light that is of the wavelength and that is received from the location; determining, by a processing system in digital communication with the sensor, based on the dataset, and for each of at least two locations in the plurality of locations, a respective value of a thickness of the material; and outputting, by the processing system, the respective value of the thickness of the material for each of the at least two locations.

Example 13

The method of example 12, wherein determining the respective value of the thickness of the material for each of the at least two locations comprises: transforming, for a first location of the at least two locations, a signal made up of the respective intensity of the light for the first location and for the plurality of wavelengths of light into a respective function in a frequency domain; determining a respective amplitude value of the respective function; and determining, based on the respective amplitude value, the respective value of the thickness of the material for the first location.

Example 14

The method of any of examples 12-13, wherein determining the respective value of the thickness of the material for each of the at least two locations comprises: determining a signal ridge in the dataset; transforming, for a first location of the at least two locations, a signal made up of the respective intensity of the light for the first location and for the plurality of wavelengths of light into a respective function in a frequency domain; determining a respective amplitude value of the respective function; determining, based on the respective amplitude value, the respective value of the thickness of the material for the first location; and determining the respective value of the thickness of the material for a second location of the at least two locations based on the respective value of the thickness of the material for the first location, a value of the respective intensity of the light for the first location and for the plurality of wavelengths of light that corresponds to the signal ridge, and a value of the respective intensity of the light for the second location and for the plurality of wavelengths of light that corresponds to the signal ridge.

Example 15

The method of any of examples 12-14, further comprising, prior to determining the respective value of the thickness of the material for each of the at least two locations, calibrating the dataset based on at least one of: a dark dataset that is obtained by the sensor while the illumination source is inactivated and a white dataset that is obtained by the sensor with approximately no loss of light from the illumination source.

Example 16

The method of example 15, wherein calibrating the dataset comprises: subtracting, from values of the dataset, corresponding values of the dark dataset to produce a dark offset dataset; subtracting, from values of the white dataset, the corresponding values of the dark dataset to produce a total offset dataset; and dividing values of the dark offset dataset by corresponding values of the total offset dataset to produce a calibrated dataset.

Example 17

The method of any of examples 12-16, wherein obtaining the plurality of consecutive datasets comprising obtaining a plurality of two-dimensional (2D) images in which a first dimension corresponds to location of the material and a second dimension corresponds to wavelength of light.

Example 18

The method of example 17, wherein: illuminating the at least a portion of the material that is within the monitoring zone with light comprises illuminating at least part of a width of the material that is within the monitoring zone with light, and the first dimension corresponds to location in a direction across the width of the material.

Example 19

The method of any of examples 12-18, wherein obtaining the plurality of consecutive datasets comprises measuring the light reflected by the material.

Example 20

The method of any of examples 12-18, wherein obtaining the plurality of consecutive datasets comprises measuring the light transmitted through the material.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure.

What is claimed is:

1. A system comprising:
    a transport system configured to transport a material through a monitoring zone, the material being substantially planar;
    a light configured to illuminate a portion of the material that is within the monitoring zone;
    a sensor configured to receive, for a plurality of points across a first axis positioned in the illuminated portion of the material, multispectral light intensity data for each point; and
    a processing system configured to receive the multispectral light intensity data, wherein:
    the processing system:
        for each point, determines a discrete Fourier transform corresponding to the multispectral light intensity data,
        from the discrete Fourier transform, identifies a characteristic peak,
        from the characteristic peak, estimates a thickness of the material, and
        from each thickness for each point along the first axis, produces a first thickness profile.

2. The system of claim 1, wherein the sensor comprises a multispectral camera.

3. The system of claim 1, wherein:
    the processing system executes a programmatic action by:
    determining whether a thickness of the material for at least one point is within a defined range of thickness values; and
    responsive to determining that the respective value of the thickness of the material for the at least one point is not within the defined range of thickness values, performing at least one of outputting an indication of the respective value of the thickness of the at least one point, activating an alarm, or halting the material transport system.

4. The system of claim 3, wherein the outputting an indication is via a display device.

5. The system of claim 1, wherein:
the light is disposed on a first side of the material, and
the sensor is disposed on a second side of the material, opposite the first side, such that the multispectral light intensity data represent radiation transmitted through the material.

6. The system of claim 5, wherein:
the processing system, before determining the discrete Fourier transform, corrects the multispectral light intensity data using a dark image (D) and a white image (W), using the formula, $$R=(I-D)/(W-D),$$

I represents the multispectral light intensity data, and
R represents corrected multispectral light intensity data.

7. The system of claim 1, wherein:
the light is disposed on a first side of the substantially planar material, and
the sensor is disposed on the first side of the material such that the multispectral light intensity data represent radiation reflected by the material.

8. The system of claim 7, wherein:
the processing system, before determining the discrete Fourier transform, corrects the multispectral light intensity data using a dark image (D) and a white image (W), using the formula, $$R=(I-D)/(W-D),$$

I represents the multispectral light intensity data, and
R represents corrected multispectral light intensity data.

9. The system of claim 1, wherein the processing system, after producing the first thickness profile, produces a global thickness map of the material by adding the first thickness profile to an earlier collected thickness profile collected along the first axis at a different position along a second axis perpendicular to the first axis.

10. The system of claim 1, wherein the light emits radiation in at least one of the visible spectrum, the ultraviolet spectrum, or the infrared spectrum.

11. The system of claim 1, wherein the light comprises at least one of a light emitting diode or a tungsten-halogen lamp.

12. The system of claim 1, further comprising a focusing optic, wherein the focusing optic is positioned between the light and the illuminated portion of the material.

13. The system of claim 12, wherein the focusing optic comprises a fiber optic cable.

14. A method comprising:
transporting a material through a monitoring zone, the material being substantially planar;
illuminating at least a portion of the material that is within the monitoring zone with a light;
obtaining, by a sensor, for a plurality of points across a first axis positioned in the illuminated portion of the material, multispectral light intensity data for each point, and;
using a processing system, for each point, wherein the using comprises:
determining a discrete Fourier transform corresponding to the multispectral light intensity data;
identifying from the discrete Fourier transform a characteristic peak;
estimating from the characteristic peak a thickness of the material; and
from each thickness for each point along the first axis, producing a first thickness profile.

15. The method of claim 14, wherein the obtaining the multispectral light intensity data comprises measuring a radiation reflected by the material.

16. The method of claim 15, further comprising:
before the determining of the discrete Fourier transform, correcting the multispectral light intensity data using a dark image (D) and a white image (W), using the formula, $$R=(I-D)/(W-D),$$

I represents the multispectral light intensity data, and
R represents corrected multispectral light intensity data.

17. The method of claim 14, wherein the obtaining the multispectral light intensity data comprises measuring a radiation transmitted through the material.

18. The method of claim 17, further comprising:
before the determining of the discrete Fourier transform, correcting the multispectral light intensity data using a dark image (D) and a white image (W), using the formula, $$R=(I-D)/(W-D),$$

I represents the multispectral light intensity data, and
R represents corrected multispectral light intensity data.

19. The method of claim 14, further comprising, after the producing the first thickness profile, producing a global thickness map of the material by adding the first thickness profile to an earlier collected thickness profile collected along the first axis at a different position along a second axis perpendicular to the first axis.

20. The method of claim 14, wherein the light emits radiation in at least one of the visible spectrum, the ultraviolet spectrum, or the infrared spectrum.

21. The method of claim 20, wherein the light comprises at least one of a light emitting diode or a tungsten-halogen lamp.

* * * * *